United States Patent
Jung et al.

(10) Patent No.: US 9,610,806 B2
(45) Date of Patent: Apr. 4, 2017

(54) TIRE-REINFORCING STEEL CORD AND RADIAL TIRE USING THE SAME

(71) Applicant: HANKOOK TIRE CO., LTD., Seoul (KR)

(72) Inventors: Kwan Woo Jung, Daejeon (KR); Il Yong Park, Daejeon (KR); Kum Kang Hwang, Daejeon (KR); Ill Soon Jang, Daejeon (KR); Ji Wan Lee, Daejeon (KR); Mi Jung Lee, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 387 days.

(21) Appl. No.: 14/248,829

(22) Filed: Apr. 9, 2014

(65) Prior Publication Data

US 2015/0068655 A1 Mar. 12, 2015

(30) Foreign Application Priority Data

Sep. 6, 2013 (KR) .......................... 10-2013-0107024

(51) Int. Cl.
*B60C 9/00* (2006.01)
*D07B 1/06* (2006.01)
(Continued)

(52) U.S. Cl.
CPC .......... *B60C 9/0007* (2013.04); *B60C 9/0057* (2013.04); *D02G 3/12* (2013.01); *D02G 3/48* (2013.01); *D07B 1/062* (2013.01); *D07B 1/0633* (2013.01); *B60C 2009/0014* (2013.04); *B60C 2009/0021* (2013.04); *B60C 2009/0071* (2013.04); *B60C 2009/0092* (2013.04); *B60C 2009/0416* (2013.04); *B60C 2009/2074* (2013.04); *B60C 2015/0685* (2013.04); *D07B 1/0646* (2013.01); *D07B 1/0653* (2013.01); *D07B 2201/2003* (2013.01);
(Continued)

(58) Field of Classification Search
CPC ................ B60C 9/0007; D07B 1/0633; D07B 2201/2003; D07B 2201/2005
See application file for complete search history.

(56) References Cited

U.S. PATENT DOCUMENTS 4,606,392 A * 8/1986 Weidenhaupt ........ B60C 9/0007
138/124
2012/0177940 A1 * 7/2012 Cheng .................... D07B 1/062
428/592

FOREIGN PATENT DOCUMENTS

| JP | 10-088488 | * | 4/1998 |
| JP | 2001-234486 | * | 8/2001 |
| KR | 1020110072246 | * | 6/2011 |

OTHER PUBLICATIONS

English machine translation of JP2001-234486, no date.*
(Continued)

*Primary Examiner* — Justin Fischer
*Assistant Examiner* — Robert Dye
(74) *Attorney, Agent, or Firm* — Hamre, Schumann, Mueller, & Larson, P.C.

(57) ABSTRACT

Disclosed is a tire-reinforcing steel cord for a radial tire. The tire-reinforcing steel cord has a double layer structure including a first-layer core and a second-layer core provided on the surface of the first-layer core. The first-layer core has an elliptical or rectangular cross section. The tire-reinforcing steel cord can improve processability, fatigue characteristics, and rolling resistance performance of a tire, resulting in improved fuel efficiency. A radial tire using the tire-reinforcing steel cord is also disclosed.

10 Claims, 4 Drawing Sheets

(51) Int. Cl.
*D02G 3/48* (2006.01)
*D02G 3/12* (2006.01)
*B60C 9/04* (2006.01)
*B60C 15/06* (2006.01)
*B60C 9/20* (2006.01)

(52) U.S. Cl.
CPC ........... *D07B 2201/2005* (2013.01); *D07B 2201/206* (2013.01); *D07B 2201/2011* (2013.01); *D07B 2201/2018* (2013.01); *D07B 2201/2025* (2013.01); *D07B 2201/2061* (2013.01); *D07B 2201/2065* (2013.01); *D07B 2205/3057* (2013.01); *D07B 2205/3067* (2013.01); *D07B 2205/3071* (2013.01); *D07B 2205/3085* (2013.01); *D07B 2205/3089* (2013.01); *D07B 2205/3092* (2013.01)

(56) References Cited

OTHER PUBLICATIONS

English machine translation of KR1020110072246, no date.*
Anonymous, "High tensile strength steel cord constructions for tyres", Research Disclosure, Mason Publications, vol. 340, No. 54, Aug. 1, 1992.*

* cited by examiner (a)               (b)

TIRE-REINFORCING STEEL CORD AND RADIAL TIRE USING THE SAME

BACKGROUND OF THE INVENTION

Field of the Invention

The present disclosure relates to a tire-reinforcing steel cord for a vehicle, and more particularly to a tire-reinforcing steel cord having a double layer structure in which a first-layer core has an elliptical or rectangular cross section, and a radial tire using the same. The tire-reinforcing steel cord can improve processability, fatigue characteristics, and rolling resistance of a tire, leading to an increase in fuel efficiency of a vehicle.

Description of the Related Art

A steel cord is a construction of several steel wires and is obtained by plating carbon steel wires with brass, subjecting the brass-plated carbon steel wires to a drawing process, and twisting the drawn wires in the combination of 1×3, 1×4, 2+2, 2+7, 3+6, 3+9+15, or the like according to use of the manufactured steel wire. The steel cord is superior to any other reinforcing material in terms of strength, modulus, thermal resistance, fatigue resistance, etc., so that it is being used as material for reinforcing rubber articles such as tires, conveyer belts, etc.

Generally a steel belt used for a tire is obtained by arranging 300 to 600 steel cords, in each of which multiple steel wires are twisted, side by side, and placing and rolling topping rubber layers on the top and bottom surfaces of the arranged steel cords. It is necessary for the steel cords to have strong adhesion to the rubber layers and have excellent durability in a harsh environment while a vehicle is running.

In the rolling-processed structure which has undergone rolling, tensile strength occurs in a compressed direction due to an elastic recovery characteristic of the steel cord. When the rolling-processed structure is cut into pieces, bending deformation of the rubber layers and the steel cords is likely to occur, and thus there is difficulty in automatic connection work in a subsequent process. Accordingly, it is important to control the bending deformation. In order to improve workability in a subsequent tire manufacturing process, when the rolling-processed structure is cut into pieces each having a predetermined unit length, structural safety is required. That is, it is necessary to prevent ends of a piece of the rolling-processed structure having the unit length obtained through the cutting from floating or sinking. Adjustment of rolling of the steel cords is important in maintaining structural stability of rubber-topped rolling-processed steel cords.

The rolling of the steel cord is referred to as residual rotation. When a torsion torque is applied to each steel wire filament to deform the steel wire such that the steel wire is twisted in a predetermined manner, the filament which is elastically deformed tends to be untwisted in a direction opposite to a twisting direction due to the elastic recovery characteristic, and a filament which has undergone excessive plastic deformation tends to be further twisted in the same direction as the twisting direction. Accordingly, after the steel cord is manufactured, residual rotation occurs.

In the steel cord industry, an overtwister, prestress roller, etc. are used to stabilize residual rotation or prevent occurrence of residual rotation. However, since it is difficult to fundamentally prevent the rolling attributable to a torsion deformation force applied to filaments when manufacturing the steel cord by twisting multiple steel filaments in a direction, improvement in this aspect is required.

Generally, a steel cord for a heavy duty tire is prepared by twisting multiple filaments of two layers or three layers. This steel cord has a dense structure in which there is no gap between the steel filaments. Rubber infiltration into the inside of the steel cord is poor. Therefore, if a tire is repeatedly bent by external force, damages of both mechanical wear and chemical corrosion, i.e., fretting fatigue occurs due to friction between the filaments and infiltration of moisture or salt, respectively. This deteriorates durability of a tire.

SUMMARY OF THE INVENTION

According to an exemplary embodiment, a tire-reinforcing steel cord includes two or more core layers in which a first core layer of the two or more core layers has an elliptical or rectangular cross section instead of a circular cross section. This structure leads to a reduction in the number of steel cords used, resulting in a lightweight steel cord. This structure also improves manufacturing processes by reducing a variation in a rotation value of the cord and durability of the tire-reinforcing steel cord by minimizing topping gauge.

In addition, the present invention is also intended to propose a radial tire having a low rolling resistance which can meet the demand for a lightweight tire for a truck or a bus. This radial tire can improve running stability and fuel efficiency of a vehicle.

In an embodiment, a tire-reinforcing steel cord includes a double layer structure including a first core layer and a second core layer serving as an outer layer surrounding the first core layer, the first core layer made up of one or more filaments each having a substantially elliptical or rectangular cross section, the second core layer being made up of a plurality of twisted filaments each having a circular cross section.

The first-layer core may include one filament or two filaments, and the second-layer core may include seven to nine filaments.

A ratio of a short-axis size S to a long-axis size B (short-to-long axis ratio) of the filament of the first-layer core may be 0.3 to 0.9, and that of the filament of the second-layer core may be 0.9 or more, so that the filament of the second-layer core has a substantially circular cross section shape.

The filaments in the first-layer core and the second-layer core may be prepared by drawing carbon steel containing 0.70% to 1.20% by weight of carbon and plating the surface of the drawn carbon steel with a metallic material in a thickness of 0.01 to 5.00 μm, in which the metallic material may be any one selected from the group consisting of brass, bronze, copper, zinc, an alloy of brass and nickel, and an alloy of brass and cobalt.

According to another aspect of the present invention, there is provided a radial tire including the tire-reinforcing steel cording according to the former aspect which is applied to any one of a carcass, a chafer, and a belt.

In the tire-reinforcing steel cord and the radial tire using the same according to the present invention, the first-layer core is manufactured to have an elliptical or rectangular cross section in order to increase a gap into which rubber can infiltrate and reduce a variation in a rotation value. This improves manufacturing processes and minimizes topping gauge.

According to an exemplary embodiment of the present invention, since rubber infiltration is improved, corrosion resistance is increased, and deterioration of rubber adhesion is suppressed. Accordingly, a tire using the tire-reinforcing steel cord according to the present invention improves in durability, thus having longer lifespan.

Since the tire-reinforcing steel cord according to an exemplary embodiment of the present invention has a relatively small diameter and includes a relatively smaller number of filaments compared with conventional tire-reinforcing steel cords, the tire-reinforcing steel cord according to the present invention leads to a lightweight tire and improvement in fuel efficiency.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
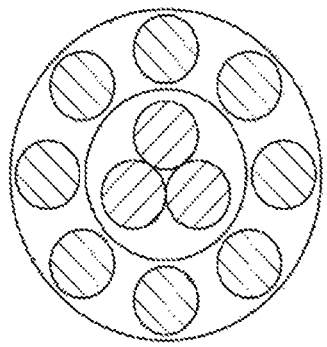
FIG. 1 is a cross-sectional view illustrating a steel cord having a double layer structure of 3×8 according to a related art.

Exemplary embodiments will now be described in greater detail hereinafter with reference to the accompanying drawings, in which embodiments of the invention are shown. These exemplary embodiments may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A tire-reinforcing steel cord according to a first embodiment includes a first-layer core made up of one or more steel filaments, and a second-layer core made up of a plurality of steel filaments which are twisted and provided as an outer layer to surround the first-layer core. The steel filament of the first-layer core has a substantially elliptical or rectangular cross section, and the steel filaments of the second-layer core have a substantially circular cross section.

Figure 2:
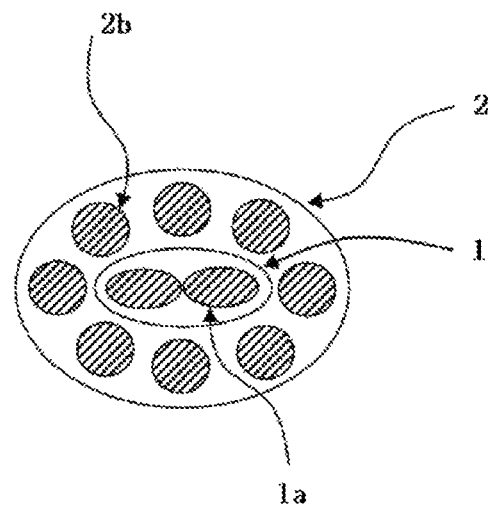
FIG. 2 is a cross-sectional view illustrating a steel cord having a double layer structure of 2×7 according to a first embodiment of the present invention.

FIG. 2 is a cross-sectional view illustrating the tire-reinforcing steel cord according to the first embodiment. With reference to FIG. 2, the tire-reinforcing steel cording according to the first embodiment includes a first-layer core 1 made up of one or two filaments 1a and a second-layer core 2 made up of 7 to 9 filaments 2b. For example, the steel cord may have a structure of 1+7, 1+8, 1+9, 2+7, 2+8, or 2+9.

A plurality of filaments 1a, 1b, and 1c which constitute the first-layer core 1 may be arranged in parallel with each other, or may be twisted.

Figure 3:
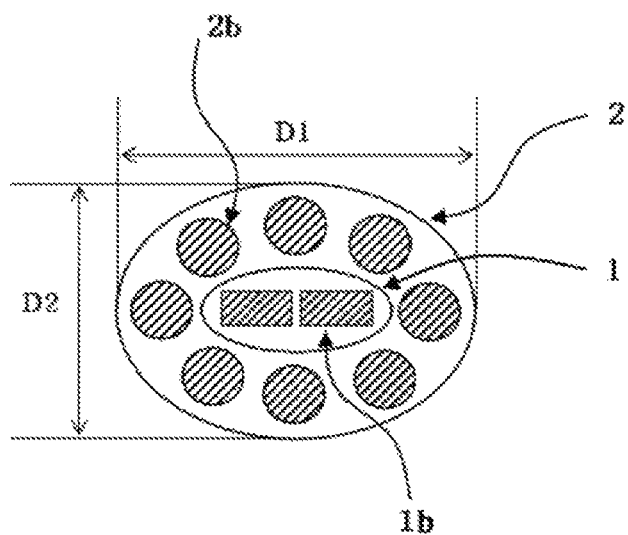
FIG. 3 is a cross-sectional view illustrating a steel cord having a double layer structure of 2×7 according to a second embodiment of the present invention.
Figure 4:
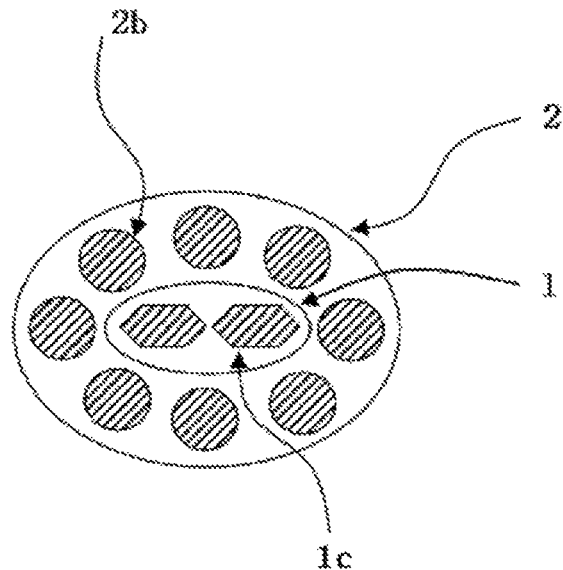
FIG. 4 is a cross-sectional view illustrating a steel cord having a double layer structure of 2×7 according to a third embodiment of the present invention.

The cross section of the filaments constituting the first-layer core 1 is not a circular shape but is an elliptical shape (refer to 1a in FIG. 2) or a rectangular shape (refer to 1b in FIG. 3). Alternatively, it may be any shape in which a ratio of a short-axis size to a long-axis size is not 1, like a hexagonal shape. In FIG. 3, reference characters D1 and D2 denote a long axis and a short axis of the steel cord, respectively.

Figure 5:
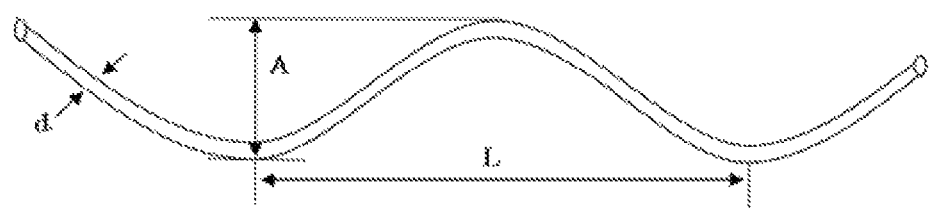
FIG. 5 is an explanatory diagram describing the pitch of wave-shaped filaments used in the embodiments of the present invention.

The filaments constituting the first-layer core 1 and the second-layer core 2 may be two-dimensionally waved filaments with a predetermined pitch. FIG. 5 is an enlarged view illustrating a two-dimensionally waved filament 1a or 2b used for the steel cord according to one embodiment of the present invention. With reference to FIG. 5, in the steel cord according to one embodiment of the present invention, part or all of the filaments constituting the first-layer core and the second-layer core are two-dimensionally waved as illustrated in FIG. 5. The two-dimensionally waved filaments meet the following conditions.

$L \text{ (mm)} = d/100 \sim 100 \times d \text{ (mm)}$ $A \text{ (mm)} = (0.02 \sim 30) \times d \text{ (mm)}$ Here, "d" is the diameter mm of the filament of the first-layer or second-layer core, L is the wavelength mm of two dimensional waves, and A is an amplitude mm of the two dimensional waves.

The diameter d of the filaments constituting the first-layer core 1 and the second-layer core 2 of the steel cord according to one embodiment of the present invention is in a range of 0.10 mm≤d≤0.40 mm. If the diameter is less than 0.10 mm, the strength of the steel cord is insufficient, it is difficult to manufacture the filaments, and manufacturing costs of the steel cord increase. Conversely, if the diameter is greater than 0.40 mm, flexibility of the filaments is insufficient, deteriorating durability of a tire.

Figure 6:
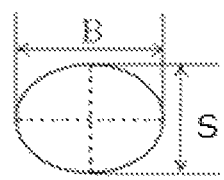
FIG. 6 is an explanatory diagram describing sizes of a long axis and a short axis of an elliptical or rectangular cross section of a filament serving as a first-layer core of the steel cord according to the first embodiment.
Figure 6:
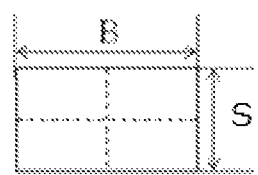

FIG. 6 is an enlarged cross-sectional view illustrating the filament 1*a* constituting the first-layer core 1 of the steel cord according to one embodiment of the present invention. The filament 1*a* has an elliptical or rectangular cross section. A ratio of a short-axis size S to a long-axis size B of the filament 1*a* of the first-layer core 1 is 0.3 to 0.9. On the other hand, a ratio of a short-axis size S to a long-axis size B of the filament 2*b* constituting the second-layer core 2 is 0.9 or higher. The diameter of the filament 2*b* of the steel cord which has an elliptical or rectangular cross section is an average value of the long-axis size and the short-axis size of the cross section, i.e., a value obtained by adding the long-axis size and the short-axis size of the cross section and dividing the sum by 2. If the ratio of the short-axis size to the long axis size is lower than 0.3, there is an advantage that rubber infiltration into the steel cord improves but the thickness of the rubber-topped sheet increases because the diameter of the steel cord is excessively large. On the other hand, if the ratio of the short-axis size to the long-axis size is higher than 0.9, a gap between the first-layer core and the second-layer core decreases, resulting in deterioration of the rubber infiltration into the steel cord.

The filaments 1*a* and 2*b* constituting the first-layer core 1 and the second-layer core 2 are obtained by drawing carbon steel containing 0.7% to 1.20% by weight of carbon, and plating the drawn carbon steel with a metallic material, such as brass, bronze, copper, zinc, an alloy of brass and nickel, or an alloy of brass and cobalt in a thickness of 0.01 to 5.00 μm. If the content of carbon in the filaments 1*a* and 2*b* constituting the first-layer core 1 and the second-layer core 2 is less than 0.70% by weight, the tire-reinforcing steel cord has a strength which cannot meet the standard of reinforcing materials for a tire or becomes excessively heavy. On the other hand, if the content of carbon in the filaments 1*a* and 2*b* is greater than 1.20% by weight, wiring breakage remarkably increases when drawing the steel into superfine filaments. That is, processability is deteriorated. When the surfaces of the filaments 1*a* and 2*b* of the first-layer core 1 and the second-layer core 2 are plated, adhesion between the filaments 1*a* and 2*b* and rubber greatly increases. Another aspect of the present invention is to provide a radial tire to which the tire-reinforcing steel cord described above is applied.

The tire-reinforcing steel cord according to the present invention may be applied to at least one of the components of a tire, including a carcass, a chafer, and a belt.

Figure 7:
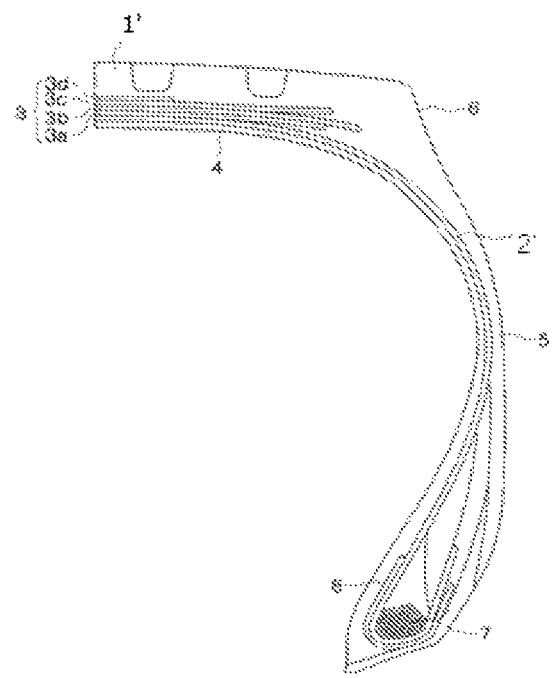
FIG. 7 is a schematic cross-sectional diagram illustrating a heavy duty tire to which a tire-reinforcing steel cord according to the present invention is applied.

FIG. 7 is a schematic cross-sectional view illustrating a tire for a vehicle to which the tire-reinforcing steel cord according to the present invention is applied. A well-known tire for a bus or a truck includes a thread 1' which comes into direct contact with the road surface, a carcass 2' serving as a framework of a tire, a belt 3 formed by belt elements 3*a*, 3*b*, 3*c* and 3*d*, and disposed between the thread 1' and the carcass 2', an inner liner 4 which prevents air leakage, a side wall which protects the carcass 2' and performs flexing motion (i.e., bending and stretching), a shoulder 6 disposed between the thread 1' and the sidewall 5, and a bead 7 which surrounds an end portion of the carcass 2' and attaches a tire to a rim.

In the radial tire for a heavy duty tire having the above-described structure, stress concentrates on the bead 7 and the belt 3. Accordingly a steel chafer 8 is used to reinforce the bead 7 in order to improve durability of the tire. The steel cord is provided in the steel chafer 8 and the belt 8 as a reinforcement material.

Figure 8:
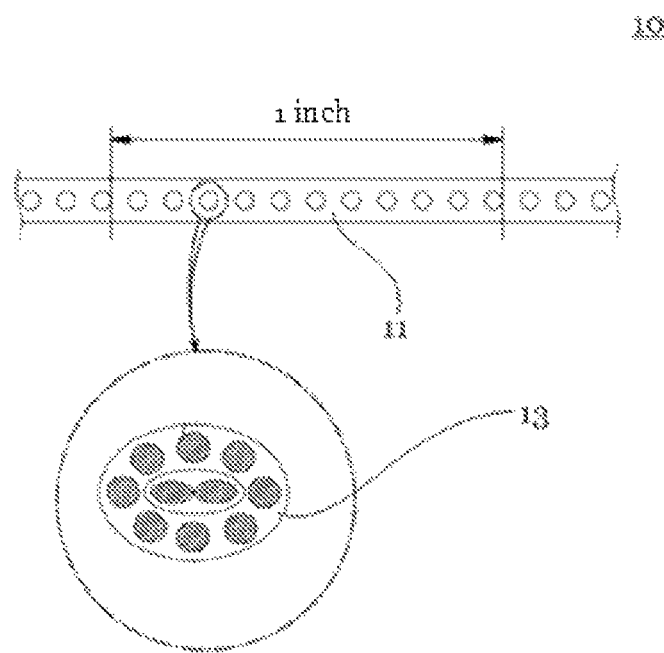
FIG. 8 is a schematic cross-sectional diagram illustrating a half-finished carcass in which the tire-reinforcing steel cord according to the present invention is included.
Figure 9:
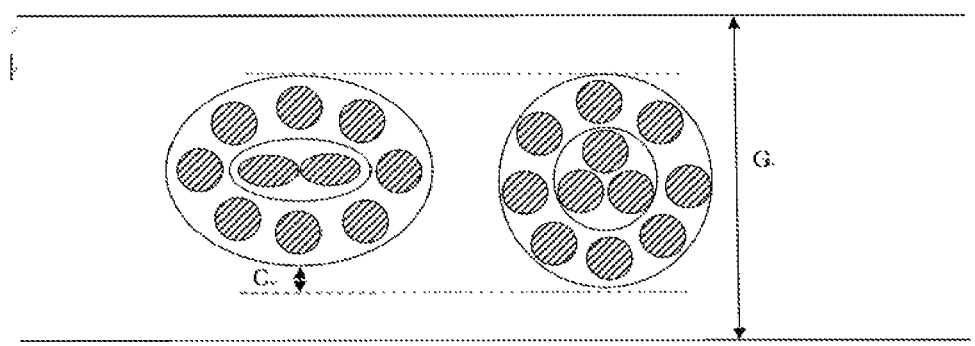
FIG. 9 is a schematic view illustrating comparison between rubber topping gauges of a rolled sheet including an elliptical steel cord according to the present invention and of a rolled sheet including a circular steel cord according to a related art.

For example, as shown in FIG. 8, a half-finished carcass (carcass ply) 10 is obtained through the following method. First, carcass cords 13 are arranged at regular intervals, a rubber topping 11 is placed on the carcass cords 13, and a stacked structure is subjected to rolling, producing a rolling-processed structure. FIG. 9 is a schematic diagram illustrating comparison between rubber topping gauges of a rolled sheet including the elliptical steel cord according to the present invention and of a rolled sheet including a circular steel cord according to a related art. When the elliptical filaments are used like in the present invention, the topping gauge is reduced as much as C (see FIG. 9). For this reason, the weight of a tire is reduced accordingly, and thus cost saving can be achieved. As the ratio of the short-axis size A to the long-axis size C of the filament 1*a* of the first-layer core 1 is decreased, the value of the C increase. Further, as the C is increased, the weight of a tire decreases and the performance of rolling resistance RR improves. In FIG. 9, reference character G denotes a width of the carcass ply 10.

When the filament of the first-layer core has an elliptical or rectangular shape like in the present invention, a variation in a residual rotation value is reduced. This prevents an end portion of the steel cord from floating or sinking due to rolling attributable residual rotation, resulting improvement in processability.

According to the present invention, the diameter of the steel cord is reduced. Furthermore, the interval between the steel cords as well as the number of filaments in the rolled sheet can be reduced. This results in a reduction in the thickness of the rolled sheet, and the gauge of the rubber topping is minimized as compared with conventional materials. This also results in a reduction in the weight of a tire. When the tire-reinforcing steel cord is applied to a tire of a vehicle, rolling resistance performance is improved, increasing fuel efficiency.

The present invention will be described in greater detail using Examples and Comparative Examples. However, the present invention is not limited by the following description.

EXAMPLE

In order to compare characteristics of a steel cord according to a related art and a steel cord according to the present invention, a wire rod having a diameter of 5.5 mm and containing 0.92% by weight of carbon was drawn, the wire rod was subjected to heat treatment and brass plating until the diameter of the wire rod became 0.75 mm. Through these processes, filaments were obtained. The first-layer core was prepared by twisting two filaments having an elliptical cross section (B/A=0.6). The second-layer core was formed by twisting 8 filaments each having a diameter of 0.35 mm around the surface of the first-layer core. Thus, a steel cord sample according to the present invention was prepared.

For the Example sample, physical properties including fatigue limit stress, initial rubber adhesion, heat aging, hot water resistance, rotation value, interval between cords, and rolling resistance performance were measured and are summarized in Table 1.

Comparative Example 1

For a conventional steel cord (refer to FIG. 1) having a 3+9 double layer structure according to Comparative Example 1 in which the cross section of the filaments of the first-layer core and the second-layer core is circular, physical properties were measured in the same manner as in Example 1 and are summarized in Table 1.

Comparative Example 2

For a conventional steel cord (refer to FIG. 1) having a 3+8 double layer structure according to Comparative Example 2 in which the cross section of the filaments of the first-layer core and the second-layer core is circular, physical properties were measured in the same manner as in Example 1 and are summarized in Table 1.

TABLE 1

| Classification | | Comparative Example 1 | Comparative Example 2 | Example 1 |
|---|---|---|---|---|
| Specification | | 3 + 9(0.20) | 3 + 8(0.20) | 2 + 8(0.20) |
| Wire carbon content (wt %) | | 0.82 | 0.92 | 0.92 |
| Cord diameter(mm) | | 1.08 | 0.85 | 0.75 |
| Fatigue limit stress (kgf/mm$^2$) | | over 90 | over 90 | over 90 |
| Initial rubber adhesion (150° C. × 30 min) | | 106 | 105 | 114 |
| Heat aging (100° C. Oven) | 7 days | 95 | 106 | 111 |
| | 14 days | 85 | 98 | 101 |
| | 21 days | 70 | 85 | 92 |
| Moisture tolerance (70° C., 96% RH) | 7 days | 94 | 104 | 110 |
| | 14 days | 69 | 100 | 102 |
| | 21 days | 62 | 85 | 95 |
| Hot water resistance (70° C.) | 7 days | 84 | 100 | 107 |
| | 14 days | 66 | 89 | 98 |
| | 21 days | 53 | 84 | 92 |
| Salt water resistance (NaCl, 20%) | 7 days | 85 | 103 | 108 |
| | 14 days | 65 | 91 | 97 |
| | 21 days | 51 | 82 | 91 |
| Topping gauge(mm) | | 1.50 | 1.20 | 1.05 |
| Variation in rotation value | | 0.6 | 0.6 | 0.1 |
| Interval between cords(mm) | | 0.2 | 0.5 | 0.4 |
| Rolling resistance(RR) | | 6.5 | 6.0 | 5.5 |

\* Fatigue limit stress was measured by a Rotating Bean Tester (RBT) made by Bekaert (a sample is rotated one million or more times under a fatigue limit stress).
\* Initial rubber adhesion was measured by ASTM D2229-99 manufactured by Instron under conditions of 150° C. and 30 minutes.
\* Heat aging was measured under a condition of 100° C. oven and moisture tolerance was measured under conditions of 70° C., 96% RH, by determining a ratio of adhesion before and after treatment. The adhesion was measured by ASTM D2229-99 manufactured by Instron.
\* Hot water resistance was measured at 70° C., and salt water resistance was measured at NaCl 20% by determining a ratio of adhesion before and after treatment. The adhesion was measured by ASTM D2229-99 manufactured by Instron.
\* Rotation value: A steel cord is unspooled as long as 6 m from a spool and the number of rotations of the steel cord was measured. The rotation value is set to 1 when the steel cord made one turn. About 72 samples were tested to obtain a variation.
\* Interval between cords: this is a value when a width of a rolled belt is 1800 mm and EPI is 19.
\* Rolling resistance performance was measured by applying samples to a tire of 12R22.5 which is a tire for a truck or a bus.

As understood from Table 1, when the filament of the first-layer core is manufactured to have an elliptical or rectangular cross section as in Example, it is possible to reduce the diameter of the steel cord. Furthermore, even though the number of filaments constituting the first-layer core is reduced in comparison with Comparative Example 2, since the interval between cords is reduced, fatigue resistance of rubber is improved. The steel cord according to the present invention can prevent topping gauge reduction and eliminate the variation in rotation value. Furthermore, since the steel cord according to the present invention has a reduced weight, rolling resistance performance is also improved.

Although a preferred embodiment of the present invention has been described for illustrative purposes, those skilled in the art will appreciate that various modifications, additions and substitutions are possible, without departing from the scope and spirit of the invention as disclosed in the accompanying claims. Accordingly, the present invention is defined only by a description of the appended claims and equivalents thereof may fall within the scope of the invention.

What is claimed is:

1. A tire-reinforcing steel cord, comprising:
   a first-layer core including two filaments; and
   a second-layer core including a plurality of filaments which are twisted around the surface of the first-layer core, wherein the filament of the first-layer core has a substantially elliptical or rectangular cross section, and the filament of the second-layer core has a substantially circular cross section,
   wherein the two filaments of the first-layer core are aligned side-by-side with one another, so that respective major axes of the elliptical cross section of the two filaments are collinearly positioned, or respective longer sides of the rectangular cross section of the two filaments are collinearly positioned, and
   a ratio of a short-axis size to a long-axis size of the two filaments of the first-layer core is in a range of 0.3 to 0.9.

2. The tire-reinforcing steel cord according to claim 1, wherein the first-layer core includes two filaments, and the second-layer core includes 7 to 9 filaments.

3. The tire-reinforcing steel cord according to claim 2, wherein the steel core has a structure of 2+7, 2+8, or 2+9.

4. The tire-reinforcing steel cord according to claim 1, wherein the two filaments of the first-layer core are arranged to be in parallel with each other, or twisted with each other.

5. The tire-reinforcing steel cord according to claim 1, wherein a ratio of a short-axis size to a long-axis size of the filaments constituting the second-layer core is higher than 0.9.

6. The tire-reinforcing steel cord according to claim 1, wherein the filaments of the second-layer core have a diameter d in a range of 0.10 to 0.40 mm, and a twisting period of the filaments is 20 to 50 times the diameter of the filaments.

7. The tire-reinforcing steel cord according to claim 1, wherein the first-layer core and the second-layer core are the same or different in twisting directions of the filaments.

8. The tire-reinforcing steel cord according to claim 1, wherein one or all of the filaments constituting the first-layer core and the second-layer core are two-dimensionally waved.

9. The tire-reinforcing steel cord according to claim 1, wherein the filaments constituting the first-layer core and the second-layer core are prepared by drawing carbon steel containing 0.70% to 1.20% by weight of carbon, plating a surface of the drawn steel with brass, bronze, copper, an alloy of brass and nickel, or an alloy of brass and cobalt in a thickness of 0.01 to 5.0 μm.

10. A radial tire comprising the tire-reinforcing steel cord according to claim 1 applied to at least one component selected from a carcass, a chafer, and a belt.

\* \* \* \* \*